(12) United States Patent  
Dettinger et al.

(10) Patent No.: US 7,469,244 B2  
(45) Date of Patent: Dec. 23, 2008

(54) DATABASE STAGING AREA READ-THROUGH OR FORCED FLUSH WITH DIRTY NOTIFICATION

(75) Inventors: Richard D. Dettinger, Rochester, MN (US); Daniel P. Kolz, Rochester, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/290,893

(22) Filed: Nov. 30, 2005

(65) Prior Publication Data

US 2007/0124317 A1    May 31, 2007

(51) Int. Cl.  
*G06F 17/30* (2006.01)

(52) U.S. Cl. ............ 707/3; 707/4; 707/5; 707/10; 707/204

(58) Field of Classification Search ................ None  
See application file for complete search history.

(56) References Cited

U.S. PATENT DOCUMENTS 6,725,227 B1    4/2004   Li

*Primary Examiner*—Khanh B Pham  
(74) *Attorney, Agent, or Firm*—Patterson & Sheridan, LLP

(57) ABSTRACT

Embodiments of the present invention allow the results of a query to an operational datastore to be augmented with relevant data that may be stored in a staging area datastore. Upon receiving a query to the operational datastore, it is determined whether data relevant to the query is present in the staging area datastore. If relevant data is present, such data may be transformed, transferred and combined with data in the operational datastore. The query is then run against the combined data and the results displayed to the user.

5 Claims, 7 Drawing Sheets

OVERVIEW

ALWAYS CHECK MODE

NOTIFIED MODE

510

| DEMOGRAPHICS | | |
|---|---|---|
| PATIENT ID | NAME | CITY |
| 1 | LON | DES MOINES |
| 2 | SANDRA | GARBER |
| 3 | KRIS | CEDAR RAPIDS |

511

| TEST | | | |
|---|---|---|---|
| EPISODE NUMBER | PATIENT ID | TEST TYPE | TEST VALUE |
| 16 | 1 | 45 | 6.783 |
| 23 | 1 | 56 | 21.34 |
| 23 | 1 | 45 | 7.2 |
| 6 | 2 | 13 | 45.7 |
| 5 | 3 | 16 | 57.8 |

512

| TRACKING TABLE | | | |
|---|---|---|---|
| TABLE | EPISODE NUMBER | PATIENT ID | STATUS |
| TEST | 7 | 3 | AVAILABLE |
| TEST | 9 | 2 | AVAILABLE |

513

| TEMP | | | |
|---|---|---|---|
| EPISODE NUMBER | PATIENT ID | TEST TYPE | TEST VALUE |

| STEST | | | |
|---|---|---|---|
| EPISODE NUMBER | PATIENT ID | TEST TYPE | TEST VALUE |
| 7 | 3 | 45 | 6.9 |
| 9 | 2 | 13 | 60.38 |

FIG. 5B

DATABASE STAGING AREA READ-THROUGH OR FORCED FLUSH WITH DIRTY NOTIFICATION

BACKGROUND OF THE INVENTION

1. Field of the Invention

The present invention generally relates to data processing and more specifically to managing datastores.

2. Description of the Related Art

A management information system may contain one or more datastores to retain data related to various business functions. Such data may be critical to decision making, planning, program implementation, control etc. Furthermore, the ability to process, store and retrieve critical data quickly and efficiently may provide a business a competitive advantage in its market. For example, critical data may indicate shifting consumer expectations. By adjusting to such trends in the market, as indicated by previously collected and processed data, a business may become more profitable. In some instances the data collected may be critical not just to the future of the business itself but also to the safety of a current customer. For example, a hospital may maintain data related to a patient's medical records. The patient's current treatment may depend on past medical history to determine the safest solutions.

The use of an information system requires accesses to a datastore containing critical information to store or retrieve such information. However, a large number of accesses to the datastore may lead to serious degradations in performance of the information system. For example, large organizations may have hundreds of salesmen accessing the datastore to retrieve product and pricing information or to store information about recently made sales. Such large numbers of accesses to the datastore at the same time may severely strain the datastore which may have a limited bandwidth. As a result, data store accesses may become extremely slow and inefficient.

One solution to this problem is to maintain two datastores: a staging area datastore and an operational datastore. The staging area datastore may have information that has not yet been inserted into the operational datastore. For example, the staging area datastore of a hospital may contain data relating to the current clinical episode for a patient. A clinical episode may contain information relating to a particular visit to the hospital. The information relating to a current clinical episode, for example, may not be inserted in the operational datastore until that clinical episode is over. Because the data contained in the staging area may have a different format, such data may be normalized, annotated and checked for errors before insertion into the operational datastore. Insertions may be performed in batches during off peak hours when system time is available. This allows systems to be better utilized. As a result, users of the operational datastore have quicker response times and the system has a more consistent work load.

However, this solution may cause problems for users when the operational datastore is queried for recent information. Such recent information may not have been inserted in the operational datastore. Consequently, the result sets returned for queries against the operational data store may contain incomplete or even in accurate data. One solution for this problem is to write an application that reads from both the operational datastore and the staging area. However, because the data contained in the operational data store and the staging datastore may be in different formats, two applications will have to be written to represent the same type of data. Additionally, as previously described, the data in the staging area may not be normalized, annotated etc., in the same way as data in the operational data store, thereby limiting the way in which it can be searched.

Therefore, what is needed is improved methods and systems to provide meaningful results of a query against a first datastore by including relevant information contained in the second datastore.

SUMMARY OF THE INVENTION

Embodiments of the present invention generally provide methods, systems and computer readable storage media for augmenting the results of a query to an operational datastore with relevant data that may be stored in a staging area datastore.

One embodiment provides a method for managing data in an operational datastore and a staging area datastore. The method generally includes configuring the staging datastore comprising defining a relationship between one or more fields of a first data structure in the staging datastore and one or more fields of a second data structure in the operational datastore, wherein the first data structure is a data source for the second data structure in the operational datastore, and defining a first query comprising at least one field in the first data structure on which the relationship between the data structures is defined, the first query being configured to query and retrieve data from the first data structure. The method further includes periodically migrating data from the first data structure to the second data structure according to the defined relationship, wherein the migrating occurs in response to a predefined condition being met. In response to receiving a user defined query configured to query to retrieve, from the first data structure, any non-migrated data relevant to the user defined query. In the event any non-migrated data relevant to the user defined query are returned, the returned non-migrated data is transformed into a format consistent with the format of the second data structure. The user defined query is then executed against a data set including the second data structure and the transformed data, and results are returned for the executed user defined query.

Another embodiment of the invention provides a system for managing data in an operational datastore and a staging area datastore. The system generally includes a staging datastore and an operational datastore. The staging datastore is configured to receive new data, store the new data in a first data structure in the staging datastore, wherein one or more fields of the first data structure have a predefined relationship with one or more fields of a second data structure in the operational datastore, receive a first query configured to query and retrieve data from the first data structure, the first query comprising at least one field in the first data structure on which the relationship between the data structures is defined. The staging datastore is further configured to periodically migrate data from the first data structure to the second data structure according to the predefined relationship, wherein the migrating occurs in response to a predefined condition being met, transform non-migrated data into a format consistent with the format of the second data structure, and execute a second query to insert the transformed non-migrated data into a data set in the operational datastore containing the second data structure. The operational datastore is configured to receive a user defined query configured to query and return data from the operational datastore, in response to receiving the user defined query, execute the first query to retrieve, from the first data structure, any non-migrated data relevant to the user defined query, and execute the user defined query against a data set including the second data structure and the transformed data.

Yet another embodiment of the invention provides a computer readable storage medium containing a program product, which, when executed performs operations for managing data in an operational datastore and a staging area datastore. The operations generally include configuring the staging datastore comprising defining a relationship between one or more fields of a first data structure in the staging datastore and one or more fields of a second data structure in the operational datastore, wherein the first data structure is a data source for the second data structure in the operational datastore, and defining a first query comprising at least one field in the first data structure on which the relationship between the data structures is defined, the first query being configured to query and retrieve data from the first data structure. The method further includes periodically migrating data from the first data structure to the second data structure according to the defined relationship, wherein the migrating occurs in response to a predefined condition being met. In response to receiving a user defined query configured to query to retrieve, from the first data structure, any non-migrated data relevant to the user defined query. In the event any non-migrated data relevant to the user defined query are returned, the returned non-migrated data is transformed into a format consistent with the format of the second data structure. The user defined query is then executed against a data set including the second data structure and the transformed data, and results are returned for the executed user defined query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 5A and 5B illustrate the contents of tables contained in an exemplary operational datastore and staging area datastore.

DETAILED DESCRIPTION OF THE PREFERRED EMBODIMENTS

Figure 1:
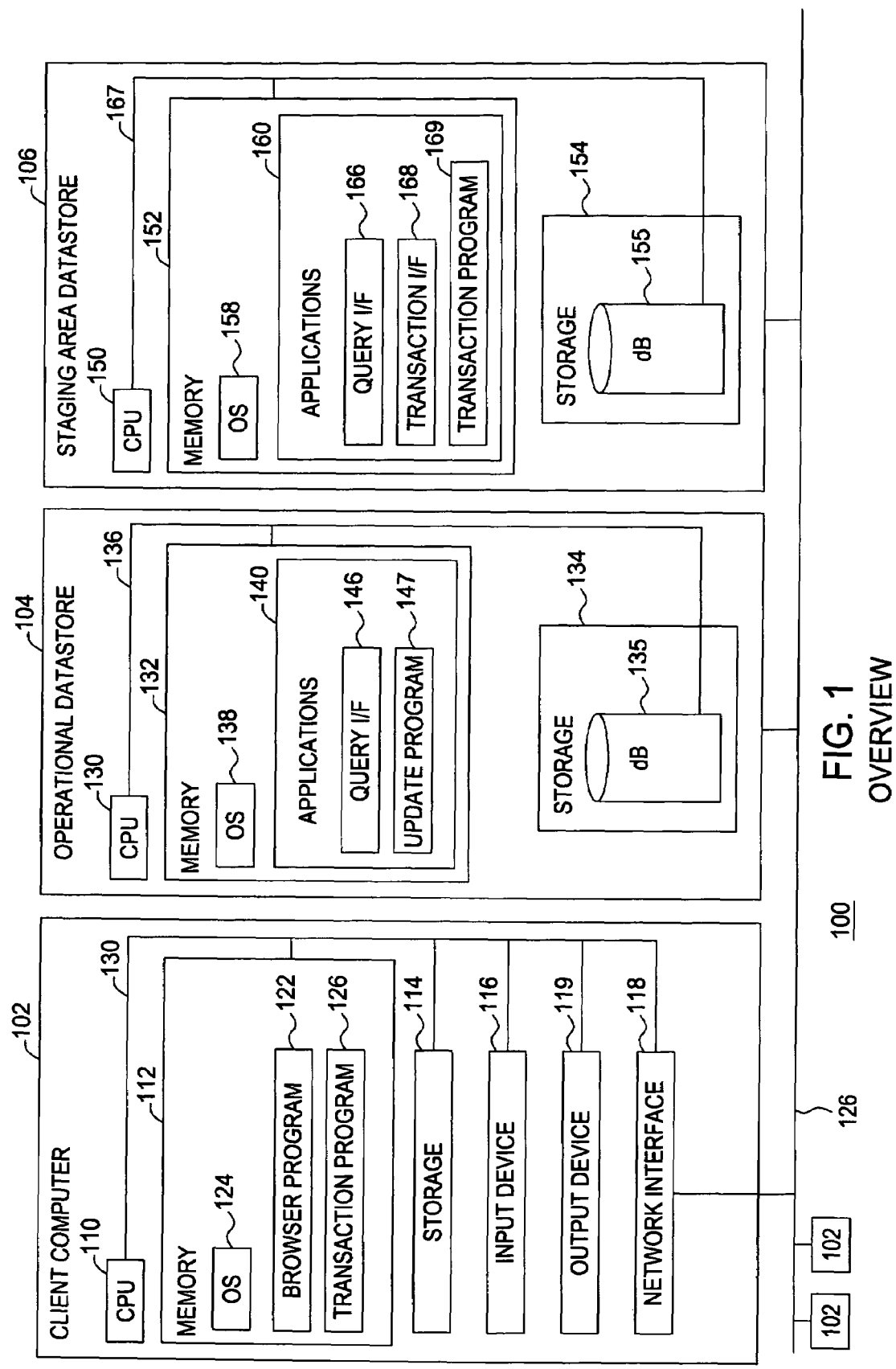
FIG. 1 is a computer system illustratively utilized in accordance with this invention.

Embodiments of the present invention allow the results of a query to an operational datastore to be augmented with relevant data that may be stored in a staging area datastore. Upon receiving a query to the operational datastore, it is determined whether data relevant to the query is present in the staging area datastore. If relevant data is present, such data may be transformed, transferred and combined with data in the operational datastore. The query is then run against the combined data and the results displayed to the user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and not considered elements or limitations of the appended claims except where explicitly recited in the claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, computer system 100 shown in FIG. 1 and described below. The program(s) of the program product defines functions of the embodiments (including the methods described herein) and can be contained on a variety of computer-readable storage media. Illustrative computer-readable storage media include, but are not limited to: (i) information permanently stored on non-writable storage media (e.g., read-only memory devices within a computer such as CD-ROM disks readable by a CD-ROM drive); or (ii) alterable information stored on writable storage media (e.g., floppy disks within a diskette drive or hard-disk drive). Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown), at least one operational datastore 104, and at least one staging area data store 106. The client computer 102, operational datastore 104, and staging area datastore 106 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102, operational datastore 104, and staging area datastore via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed by CPU 110, provides support for querying the operational datastore 104. The memory 112 may also contain a transaction program 126 that, when executed by the CPU 110, provides support for storing data in the staging area datastore 106. In one embodiment, the browser program 122 and the transaction program 124 include a web-based Graphical User Interface (GUI), which allows the user to display Hyper Text Markup Language (HTML) information. More generally, however, the browser program 122 and transaction program 126 may be GUI-based programs capable of rendering the information transferred between the client computer 102 and the datastores 104 and 106.

The operational datastore 104 may by physically arranged in a manner similar to the client computer 102. Accordingly, the operational datastore 104 is shown generally comprising a CPU 130, a memory 132, and a storage device 134, coupled to one another by a bus 136. Memory 132 may be a random access memory sufficiently large to hold the necessary programming and data structures that are located on the operational datastore 104.

The operational datastore 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140. Applications 140 may include a query interface 146 and an update program 147. The applications 140 are software products comprising a plurality of instructions that are resident at various times in various memory and storage devices in the computer system 100. When read and executed by one or more processors 130 in the operational datastore 104, the applications 140 cause the computer system 100 to perform the steps necessary to execute steps or elements embodying the various aspects of the invention. The query interface 146 (and more generally, any requesting entity, including the operating system 138) is configured to issue queries against a database 135 (shown in storage 134). The database 135 is representative of any collection of data regardless of the particular physical representation. By way of illustration, the database 135 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data. The update program 147, when executed by the CPU 130, provides support for querying the staging area datastore 106 to update database 135.

The staging area datastore 106 may by physically arranged in a manner similar to the operational datastore 104. Accordingly, the staging area datastore 106 is shown generally comprising a CPU 150, a memory 152, and a storage device 154, coupled to one another by a bus 167. Memory 152 may be a random access memory sufficiently large to hold the necessary programming and data structures that are located on the staging area datastore 106.

The staging area datastore 106 is generally under the control of an operating system 158 shown residing in memory 152. Examples of the operating system 158 include IBM OS/400®, UNIX, Microsoft Windows®, and the like. More generally, any operating system capable of supporting the functions described herein may be used.

The memory 152 further includes one or more applications 160. The applications 160 may include a query interface 166, a transaction interface 168, and a transaction program 169. The applications 160 are software products comprising a plurality of instructions that are resident at various times in various memory and storage devices in the computer system 100. When read and executed by one or more processors 150 in the staging area datastore 106, the applications 160 cause the computer system 100 to perform the steps necessary to execute steps or elements embodying the various aspects of the invention. The query interface 166 (and more generally, any requesting entity, including the operating system 158) is configured to issue queries against a database 155 (shown in storage 154). The database 155 is representative of any collection of data regardless of the particular physical representation. As with database 135, the database 155 may be organized according to a relational schema (accessible by SQL queries) or according to an XML schema (accessible by XML queries). However, the invention is not limited to a particular schema and contemplates extension to schemas presently unknown. Transaction interface 168 may be configured to store data received over the network into database 155. Transformation program 169, when executed by the CPU 150, may transform data contained in database 155 into a form compatible with the data in database 135.

Relational View of Environment

Figure 2:
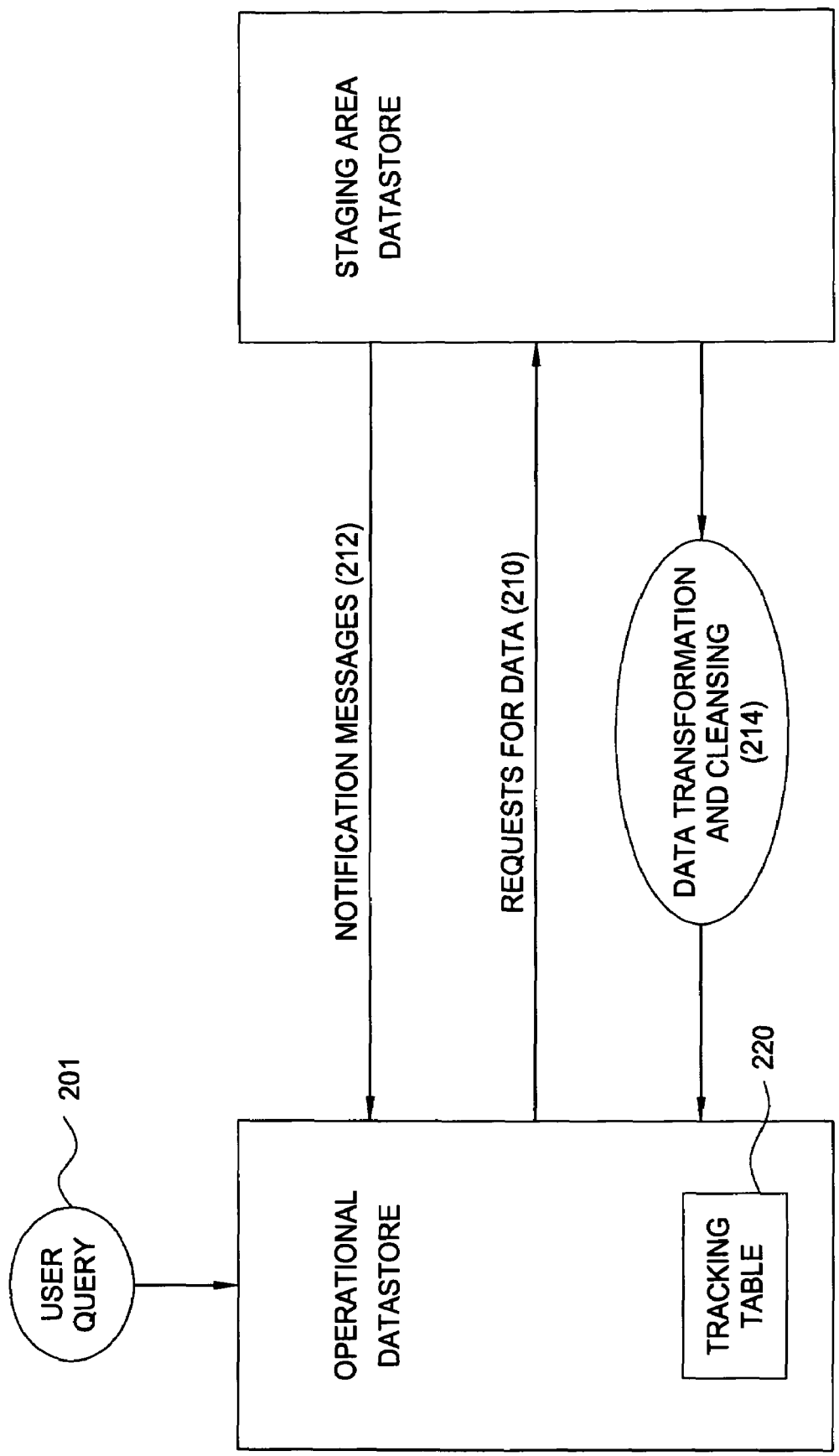
FIG. 2 is a relational view of the components of the invention according to one embodiment.

FIG. 2 generally illustrates the transactions between the operational datastore 104 and the staging area datastore 106. In response to receiving a query 201, the operational datastore may determine whether data relevant to the query is present in the staging area datastore. To this end, the operational datastore may be configured to operate in one or more modes. In one embodiment of the invention, the operational datastore is configured to be in an "always check" mode. In the always check mode, the operational datastore assumes that relevant data may be present in the staging area datastore. Therefore, operational datastore 104 may attempt to recover such data, for example, by sending a predefined Request For Data query 210, every time a user query 201 is received.

Alternatively, the operational datastore 104 may be configured to operate in the "notified" mode. In the notified mode, the operational datastore may maintain a tracking table 220 to determine if data relevant to a user query is present in the staging area datastore. Each time an entry is made into the staging area, Notification Messages 212 may be sent to the operational datastore by the staging area to indicate the presence of new information. Therefore, upon receipt of the user query, the operational datastore may retrieve relevant data from the staging area only if the tracking table 220 indicates the presence of new relevant data. While the always check mode and notified mode are described herein, the invention is not limited to these two modes. Those skilled in the art will recognize that any other means for determining whether data relevant to a query to the operational datastore is present in the staging area datastore may be used, all of which are in the scope of the present invention.

Figure 3A:
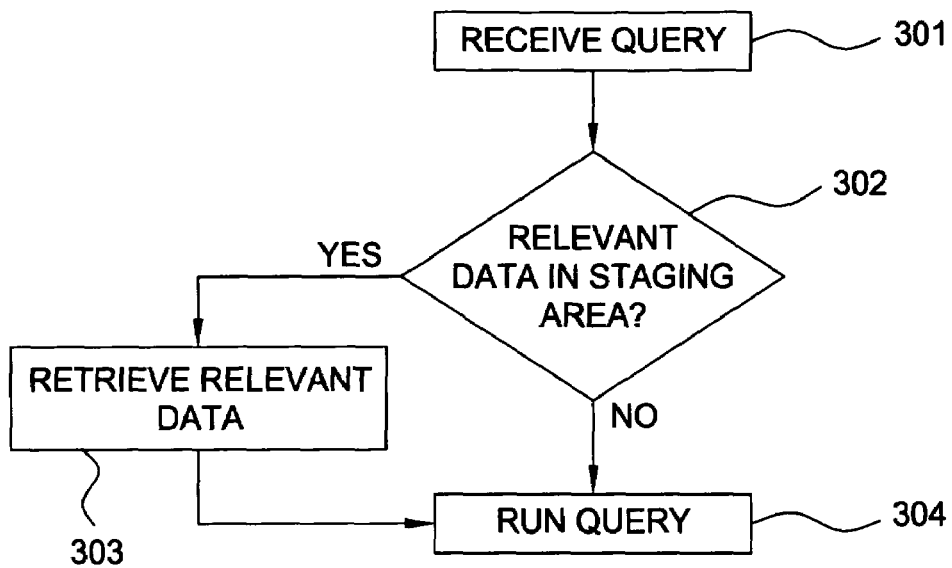
FIGS. 3A and 3B are flow diagrams for exemplary operations in the notified and always check modes, according to one embodiment of the invention.

FIG. 3A is a flow diagram that illustrates exemplary operations performed by the operational datastore in the always check mode. The operations begin in step 301 by receiving a query to the operational datastore. In step 302, the operational datastore may determine if data relevant to the received query is present in the staging area datastore by querying the staging area. If relevant data is present in the staging area, such data is retrieved in step 303 and combined with data in the operational datastore. Finally, in step 304, the query is run against the combined data. If relevant data is not present in the staging area, the query is simply run against the data in the operational datastore in step 304.

Figure 3B:
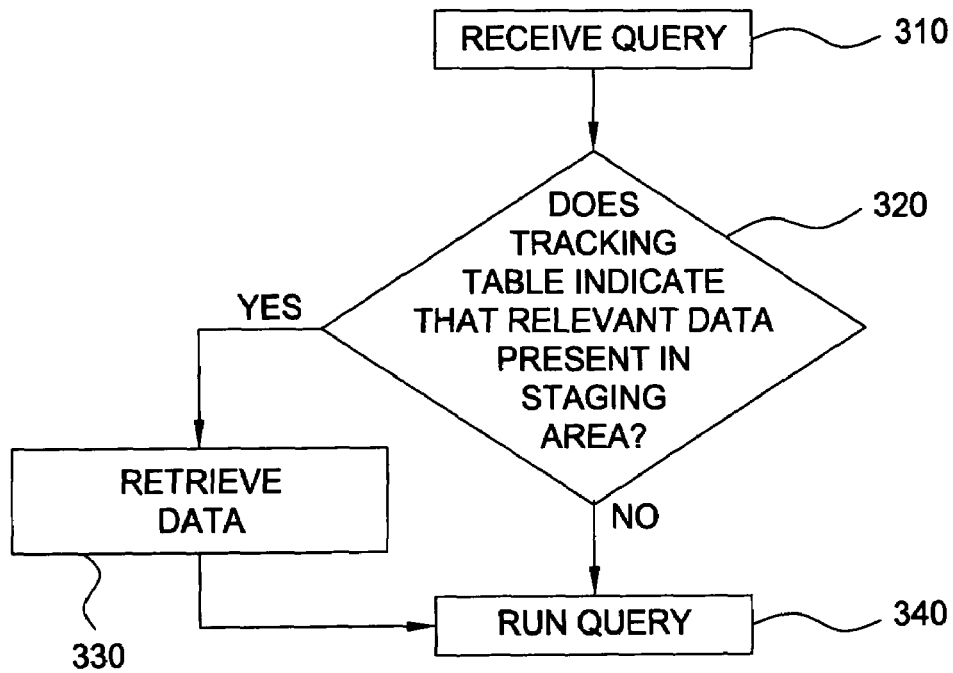

FIG. 3B is a flow diagram that illustrates exemplary operations performed by the operational datastore in the notified mode. The operations begin in step 310 by receiving a query to the operational datastore. In step 320, the operational datastore may determine if data relevant to the received query is present in the staging area datastore by examining the tracking table. If the tracking table indicates that relevant data is present in the staging area, such data is retrieved in step 330 and combined with data in the operational datastore. Finally, in step 340, the query is run against the combined data. If the tracking table indicates that relevant data is not present in the staging area, the query is simply run against the data in the operational datastore in step 340.

Referring back to FIG. 2, when data is inserted into the operational datastore, it may be transformed and cleansed (214). During transformation and cleansing, the values of various data fields in the staging area may be normalized, annotated, or checked for plausibility or warning indicators. For example, normalization may involve matching data fields in the staging area to data fields in the operational datastore based on predefined relationships between the data fields. Checking plausibility may involve determining errors based on predefined logic. For example, data reflecting a four year old male who is indicated as pregnant may be implausible and the data may be flagged as being erroneous.

Figure 4:
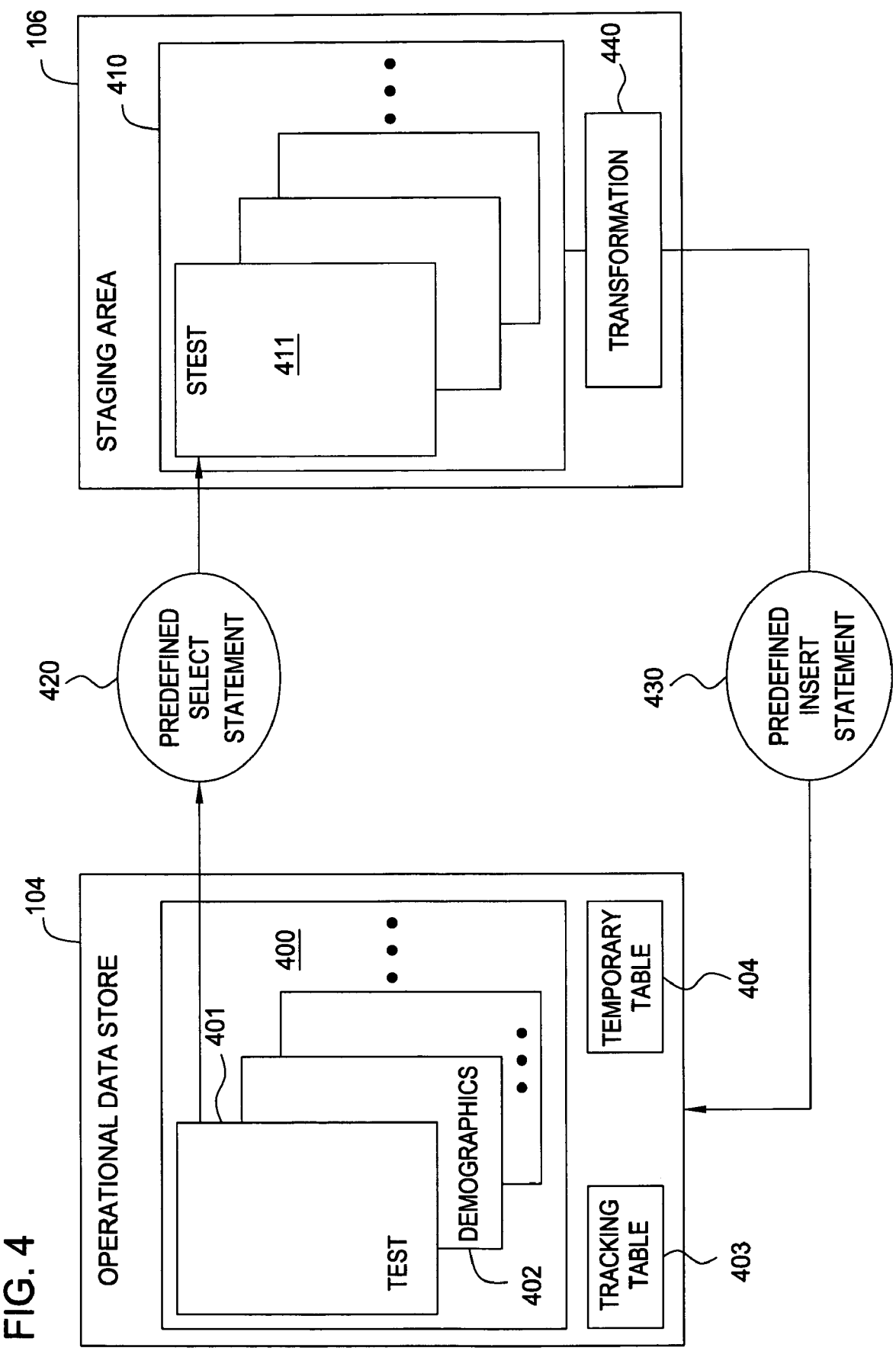
FIG. 4 illustrates an exemplary operational datastore, staging datastore and their contents.

FIG. 4 illustrates an exemplary operational datastore, staging area datastore and their contents according to one embodiment of the invention. The operational datastore may be organized on a per table basis. For example, in FIG. 4, operational datastore 104 contains tables 400. Tables 400 may contain a test table 401 and demographics table 402. However, any number of tables 400 may be created in the operational datastore 104. Each of the tables 400 may be separately configured in either the always check mode or the notified mode. Operational datastore 104 may contain a tracking table 403 to receive notification messages from the staging area 106 indicating new data. The operational datastore may also contain a temporary table 404, which is described in greater detail below.

As with the operational datastore, the staging area 106 may also be organized on a per table basis. For example in FIG. 4, the staging area 106 contains tables 410. Tables 410, for example may further contain a table Stest among other tables. The staging area may also contain Transformation logic 440 to perform transformation and cleansing of data contained in the staging area before it is transferred to the operational datastore.

Each table in the staging area datastore may be declared to be a source table for data in the operational datastore at the time of its creation. Such configuration may involve defining a primary key or join constrain columns that relate fields of a record in the staging area with fields of a record in the operational datastore. For example, in a hospital information system, the patient ID and episode number may be defined as columns that join data in the staging area and the operational datastore. Furthermore, transformation logic 440 that transforms, filters and/or cleanses data before it is inserted in the operational datastore may also be defined.

Configuration of a table in the staging area may involve defining predefined select statement 420 and predefined insert statement 430. Predefined select statement 420 may be defined for each of tables 410 in the staging area datastore and an associated table in tables 400 in the operational datastore to select a specific primary key and join constrain. For example, predefined select statement 420 may define a relationship between test table 401 and Stest 411, as illustrated. If the patient ID (PID) is defined as a primary key, then the predefined select statement 420 may be:

```
SELECT * FROM Stest
WHERE PID = ?
```

In this example, any value may be substituted for the parameter "?" to select a particular patient ID (PID) from Stest.

Similarly, predefined insert statement 430 may be defined for each of tables 410 and an associated table in tables 400 to transfer a record from the staging area to the operational datastore. For example, predefined insert statement 430 may define a relationship between test table 401 and Stest 411. For example, the predefined select statement 420 may be:

```
INSERT INTO test
VALUES (value 1, value 2... value n)
```

Values 1-n may be transformed and cleansed values related to a particular patient ID (PID) from Stest to be inserted in the operational datastore.

In one embodiment of the invention, predefined insert statement 430 may facilitate a temporary transfer of data from the staging area to the operational datastore. Such a temporary transfer may involve transferring data in the staging area into temporary table 404 in the operational datastore. A union operation may be performed on the temporary table 404 and one of tables 400 to combine the respective data into the resultant (unioned) temporary table. A user query may then be run against the (unioned) temporary table. In one embodiment, when the transfer of data is temporary, the data transferred is not deleted in the staging area, but rather is preserved until a permanent transfer can take place. A temporary transfer of data may be performed, for example, when a patient episode lasts for multiple days and queries to the operational datastore during the episode are necessary. In such instances, queries to the operational datastore may result in a temporary transfer of data relating to the current clinical episode, a permanent transfer being delayed until the end of the current episode.

In another embodiment of the invention, all transfers from the staging area may be permanent transfers, with the predefined insert statement 430 directly transferring data from one of tables 410 in the staging area to one of tables 400 in the operational datastore.

FIGS. 5A and 5B illustrate a simple example describing relationships between the tables 400 in the operational datastore and tables 410 in the staging area datastore and their content. In FIG. 5A, a Demographics table 510, with columns for Patient ID (PID), patient name, and city of residence is shown. For simplicity, only 3 patients are described. A Test table 511 with columns for PID, episode number, test type and test value is provided. A Tracking Table 512 is also provided for tables which are declared to run in notified mode. Tracking table 512 contains a table column to identify the table where the given record will be inserted, episode number and PID columns that contain join constrain values, and a status value indicating the availability of the record in the staging area. The operational datastore may also contain a Temporary table 513 that may be used to combine data from the operational datastore and the staging area. If temporary table is used to combine data in the staging area with data in Test table 511, it will contain columns similar to the Test table, as illustrated.

FIG. 5B illustrates the contents of the STest 521 in the staging area. For simplicity, the STest table has the same structure as Test table 511. However, one skilled in the art will recognize that STest may have a different format than Test. For each patient visit, an entry is made in the staging area. For example, for Patient Kris' visit, an episode number of 7 is assigned. Test 45 was conducted and the result of the test was 6.9. The values for this episode are entered in the staging area accordingly and a notification message is sent to the operational datastore. As illustrated, STest contains two entries. Because STest is declared as a source for Test, which is configured to operate in notified mode, Tracking Table 512 also contains two entries that indicate the presence of data in the STest for Test.

If a user enters a query for a patient with a PID of 3, the Tracking Table reveals that more information is available in the staging area. As previously discussed, a predefined select statement selecting records in STest with PID equal to 3 is then run against STest. Found records may then be transformed. In this example, no transformation step is necessary because Test and STest have the same format. Finally, a predefined insert statement is used to write the new information into a table in the operational datastore. If the transfer is temporary, the new information is transferred into Temporary table 513. A union operation is performed between the Temporary Table and Test so that the Temporary Table contains the information in the Test Table and the new information retrieved from the staging area. The user query is then run against the temporary table and the results displayed. Alternatively, the new information may be directly inserted into Test, the user query run against Test, and the results displayed.

Figure 6:
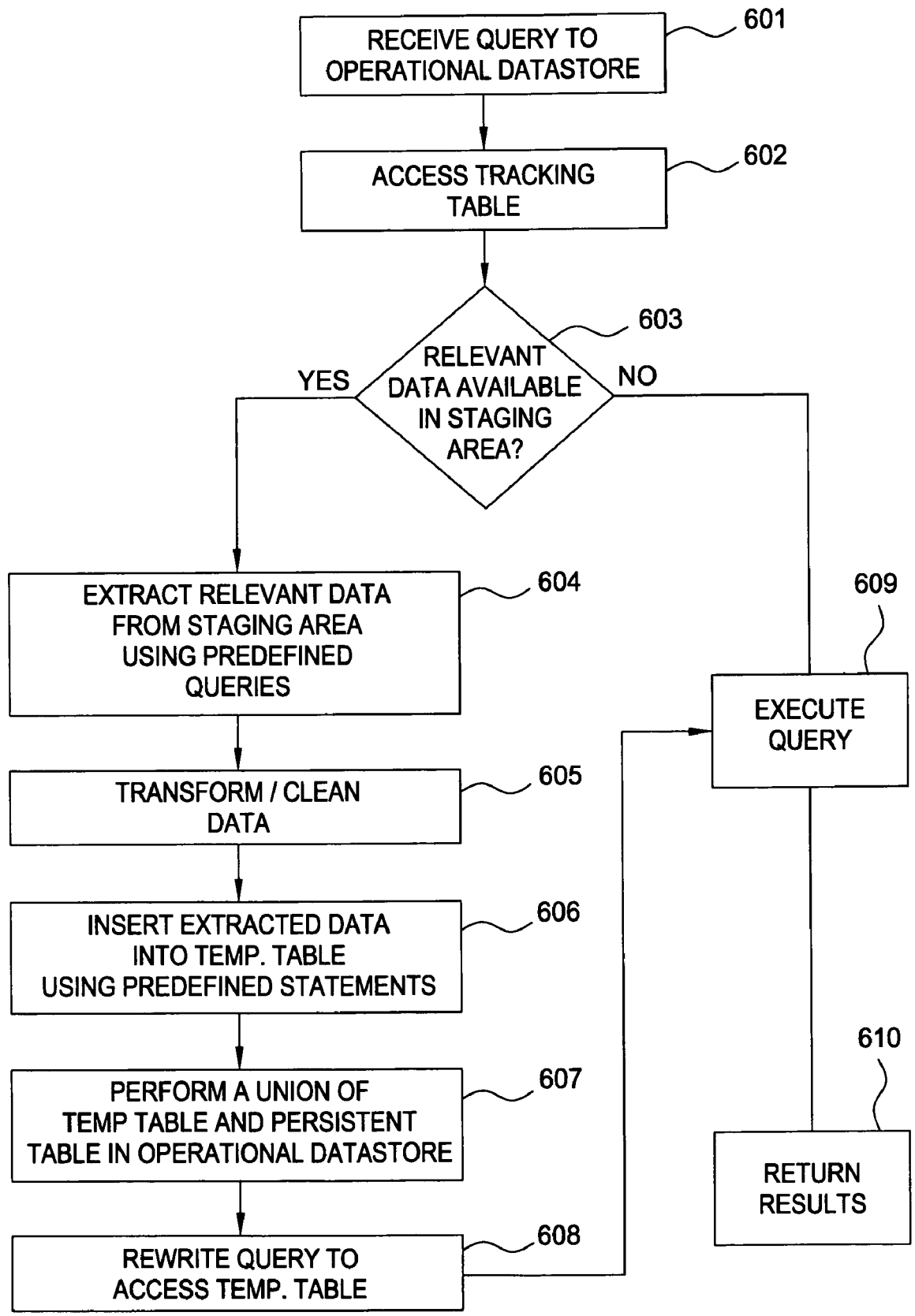
FIG. 6 is a flow diagram for exemplary operations performed to temporarily transfer data from the staging area according to one embodiment of the invention.

FIG. 6 is a flow diagram that illustrates exemplary operations performed in accordance with an embodiment of the invention in which transfers from the staging area are temporary. The operations begin in step 601 by receiving a user query to the operational datastore. If the table to be queried is configured to be in the notified mode, the tracking table in the operational datastore may be accessed in step 602. In step 603, the tracking table may be searched to determine if data relevant to the query is present in the staging area. Alternatively, the table may be configured in always check mode, which may result in the staging area being queried directly, as previously described.

If it is determined that no relevant data is present in the staging area, the query is run against an appropriate table in the operational datastore in step 609 and the results returned to the user in step 610. If, on the other hand, it is determined that relevant data is present in the staging area, such data is selected in the staging area using a predefined select statement in step 604. The selected data is transformed and cleansed in step 605. In step 606, a predefined insert statement is used to insert the data into a temporary table in the operational datastore. In step 607, a union operation is performed on the temporary table and the table initially queried to combine the data from the staging area and the table initially queried in the temporary table. The user query may be rewritten to run against the (unioned) temporary table in step 608. Finally, the query is run against the (unioned) temporary table and the results returned to the user in step 610.

Figure 7:
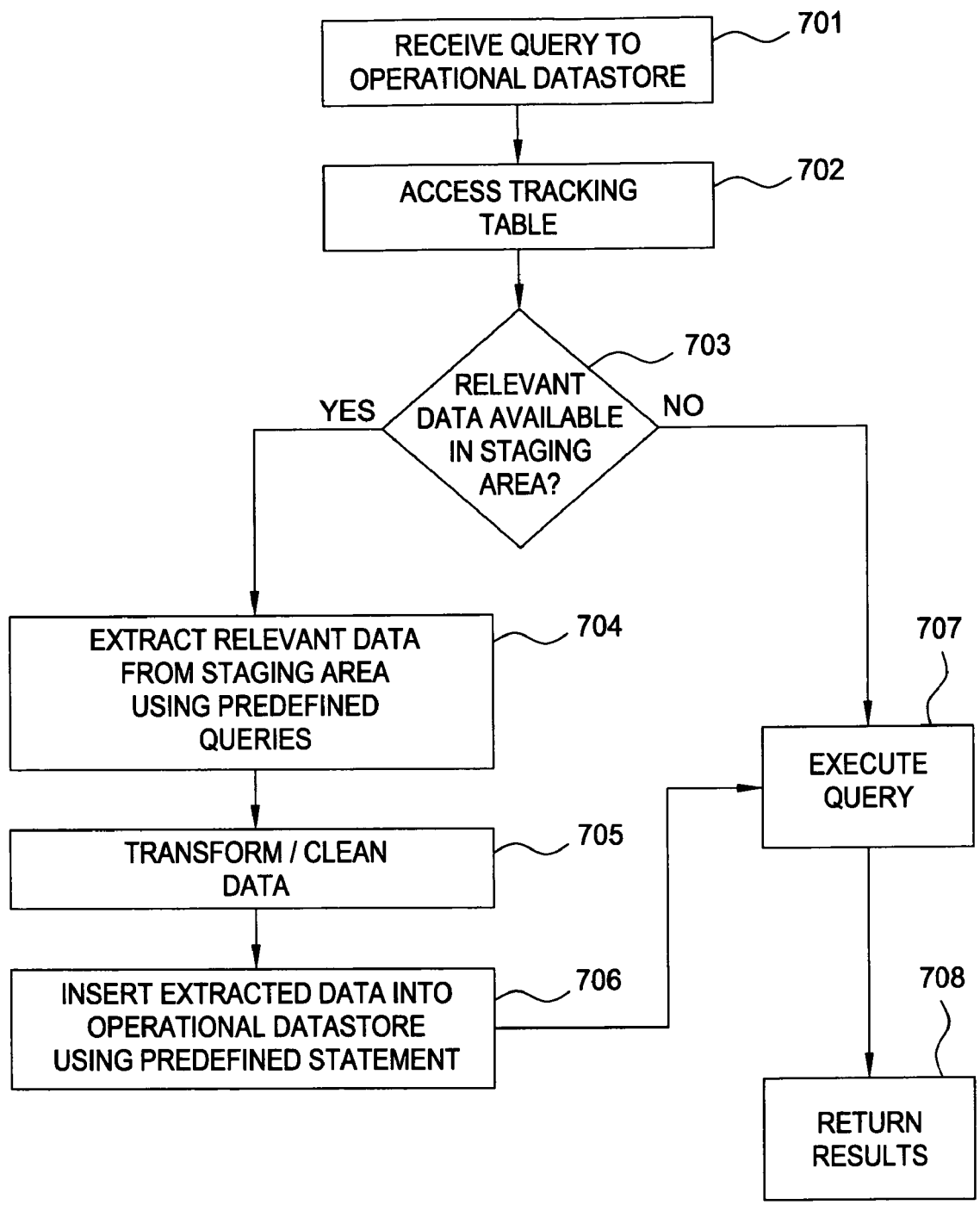
FIG. 7 is a flow diagram for exemplary operations performed to permanently transfer data from the staging area according to one embodiment of the invention.

FIG. 7 illustrates exemplary operations performed in accordance with an embodiment of the invention in which transfers from the staging area are permanent. The operations begin in step 701 by receiving a user query to the operational datastore. If the table to be queried is configured to be in the notified mode, the tracking table in the operational datastore may be accessed in step 702. In step 703, the tracking table may be searched to determine if data relevant to the query is present in the staging area. Alternatively, the table may be configured in always check mode, which may result in the staging area being queried directly, as previously described.

If it is determined that no relevant data is present in the staging area, the query is run against an appropriate table in the operational datastore in step 707 and the results returned to the user in step 708. If, on the other hand, it is determined that relevant data is present in the staging area, such data is selected in the staging area using a predefined select statement in step 704. The selected data is transformed and cleansed in step 705. In step 706, a predefined insert statement is used to insert the data into the queried table in the operational datastore. The query is run against the table and the results returned to the user in step 708.

CONCLUSION

By providing a means to augment the results of a query to an operational datastore with data relevant to the query in a staging area, the present invention allows a user to retrieve more recent and perhaps critical information that was not transferred to the operational datastore from the staging area. As a result, the user may be allowed to perform a more efficient and effective query to the operational datastore.

While the foregoing is directed to embodiments of the present invention, other and further embodiments of the invention may be devised without departing from the basic scope thereof, and the scope thereof is determined by the claims that follow.

What is claimed is:

1. A method for managing data in an operational datastore and a staging datastore comprising:
    configuring the staging datastore, comprising:
        (a) defining a relationship between one or more fields of a first data structure in the staging datastore and one or more fields of a second data structure in the operational datastore, wherein the first data structure is a data source for the second data structure in the operational datastore; and
        (b) defining a first query comprising at least one field in the first data structure on which the relationship between the data structures is defined, the first query being configured to query and retrieve data from the first data structure;
    periodically migrating data from the first data structure to the second data structure according to the defined relationship, wherein the migrating occurs in response to a predefined condition being met, wherein the first data structure and the second data structure both include episodic data and wherein the first data structure includes data for currently incomplete episodes and the second data structure only includes data for completed episodes; wherein the predefined condition is completion of an episode;
    receiving a user defined query configured to query and return data from the second data structure in the operational datastore, wherein the query is configured to request episodic data including data for at least one episode which is currently incomplete;
    in response to receiving the user defined query, executing the first query to retrieve, from the first data structure, any non-migrated data relevant to the user defined query, the non-migrated data relevant to the user defined query including data relating to the at least one episode which is currently incomplete;
    in the event any non-migrated data relevant to the user defined query are returned, transforming the returned non-migrated data into a format consistent with the format of the second data structure;
    generating a temporary data structure in the operational data store;
    combining the data from the second data structure and the transformed data into the temporary data structure;
    transforming the user-defined query into a rewritten format capable of execution against the temporary data structure;
    executing the user defined query in the rewritten format against the temporary data structure;
    returning results for the executed user defined query, whereby the results include data from the first data structure and the second data structure; and
    upon completion of the at least one episode, migrating data relating to the at least one episode from the first data structure to the second data structure according to the defined relationship, whereby query results for subsequent user-defined queries for data relating to the at least one episode can be returned from the second data structure without need for a temporary data structure.

2. The method of claim 1, wherein retrieving non-migrated data relevant to the user defined query from the staging datastore comprises executing the first query in response to first determining the presence of such non-migrated data in the staging datastore.

3. The method of claim 2, wherein determining the presence of non-migrated data in the staging datastore comprises examining a tracking data structure in the operational datastore, wherein the tracking data structure contains data indicating the presence of non-migrated data in the staging datastore.

4. The method of claim 1, wherein retrieving non-migrated data relevant to the user defined query from the staging datastore comprises:
    selecting the first query from a plurality of predefined queries, wherein the plurality of predefined queries are based on other predefined relationships between other data structures in the operational datastore and staging datastore, respectively; and
    executing the selected query.

5. The method of claim 1, wherein the second data structure is configured in one of at least two available modes of operation for determining the presence of new data in the staging datastore, the modes comprising:
    a first mode of operation comprising executing the first query each time the user defined query is received; and a second mode of operation comprising executing the first query in response to determining the presence of non-migrated data relevant to the user defined query in the staging datastore.

* * * * *